(12) United States Patent
Toma et al.

(10) Patent No.: US 7,859,791 B2
(45) Date of Patent: Dec. 28, 2010

(54) PERPENDICULAR MAGNETIC RECORDING HEAD HAVING A MAIN MAGNETIC POLE LAYER WITH A TRAPEZOIDALLY SHAPED FLARED PART WITH A RATIO OF THE LENGTH OF THE LONG BASE TO THAT OF THE SHORT BASE IS EQUAL TO 1

(75) Inventors: Yusuke Toma, Niigata-ken (JP); Hiroshi Kameda, Niigata-ken (JP); Eiji Ozaki, Niigata-ken (JP)

(73) Assignee: TDK Corporation, Tokyo (JP)

( * ) Notice: Subject to any disclaimer, the term of this patent is extended or adjusted under 35 U.S.C. 154(b) by 782 days.

(21) Appl. No.: 11/697,222

(22) Filed: Apr. 5, 2007

(65) Prior Publication Data

US 2007/0236834 A1 Oct. 11, 2007

(30) Foreign Application Priority Data

Apr. 7, 2006 (JP) .............................. 2006-106558

(51) Int. Cl.
*G11B 5/127* (2006.01)
(52) U.S. Cl. .............................. 360/125.07; 360/125.09; 360/125.1
(58) Field of Classification Search ................................ 360/125.01–125.32
See application file for complete search history.

(56) References Cited

U.S. PATENT DOCUMENTS 6,952,325 B2* 10/2005 Sato et al. .............. 360/125.08
7,535,675 B2* 5/2009 Kimura et al. ......... 360/125.09
2003/0021063 A1 1/2003 Kuroda et al.

FOREIGN PATENT DOCUMENTS

| JP | 2002-197611 | 7/2002 |
|---|---|---|
| JP | 2003-203311 | 7/2003 |
| JP | 2006-018985 | 1/2006 |

OTHER PUBLICATIONS

Office Action issued in corresponding Japanese Patent Application No. 2006-106558; issued May 7, 2008.

* cited by examiner

*Primary Examiner*—A. J. Heinz
(74) *Attorney, Agent, or Firm*—Brinks Hofer Gilson & Lione

(57) ABSTRACT

A perpendicular magnetic recording head includes a nonmagnetic insulating layer and a main magnetic pole layer disposed on the nonmagnetic insulating layer. The main magnetic pole layer includes a pole straight part exposed in an opposing surface opposite a recording medium and a flared part that extends from the pole straight part in a height direction. The flared part broadens in a track width direction as the flared part extends in the height direction. The pole straight part of the main magnetic pole layer as viewed from the opposing surface has a trapezoidal shape over its entire length, the trapezoidal shape being narrowed at the nonmagnetic insulating layer-side. The flared part as viewed from the opposing surface has a trapezoidal shape at least at a junction with the pole straight part, the trapezoidal shape being narrowed at the nonmagnetic insulating layer-side.

2 Claims, 20 Drawing Sheets

LARGE Tw

SMALL Tw

110A'

110B'

110A''

110B''

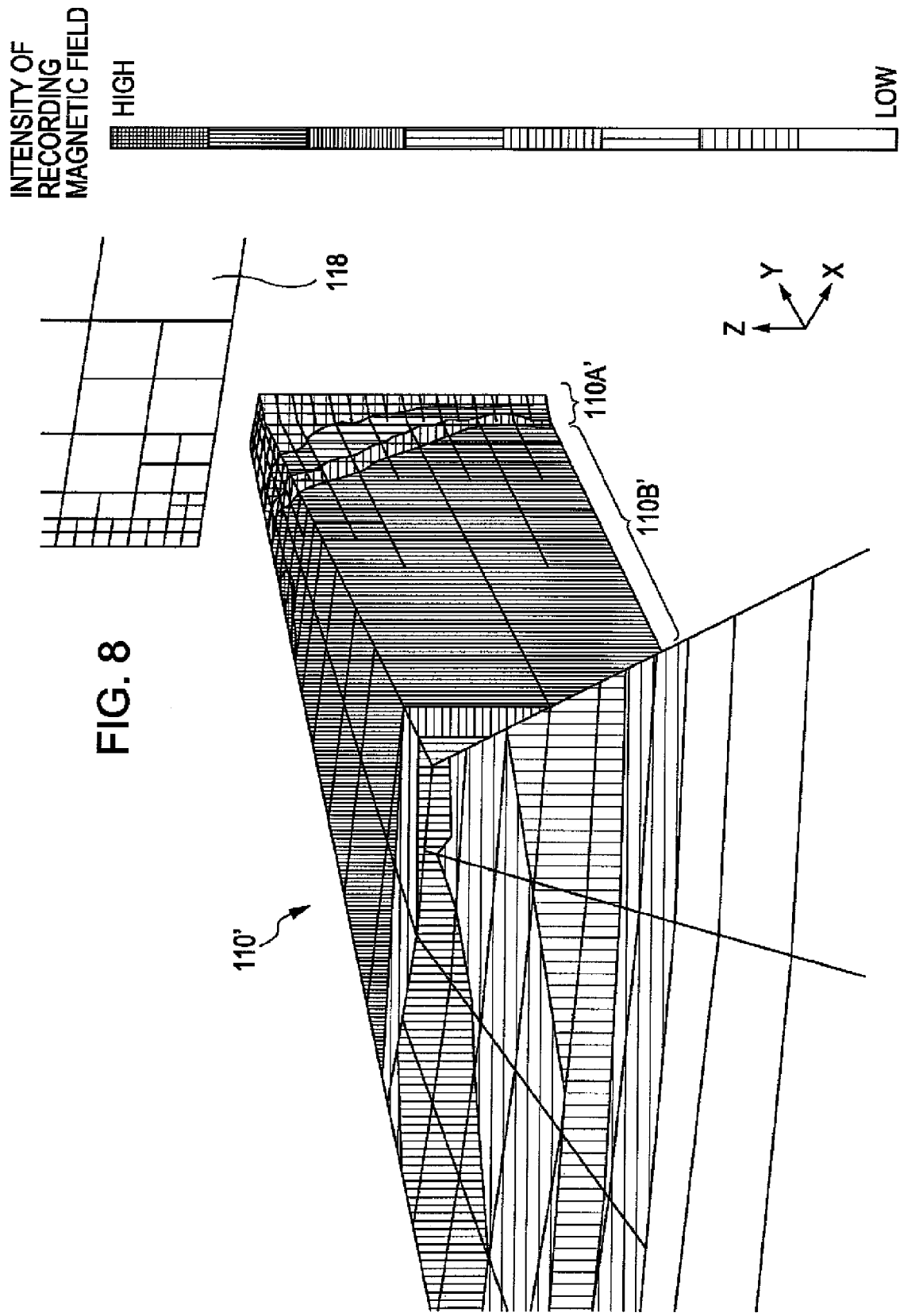

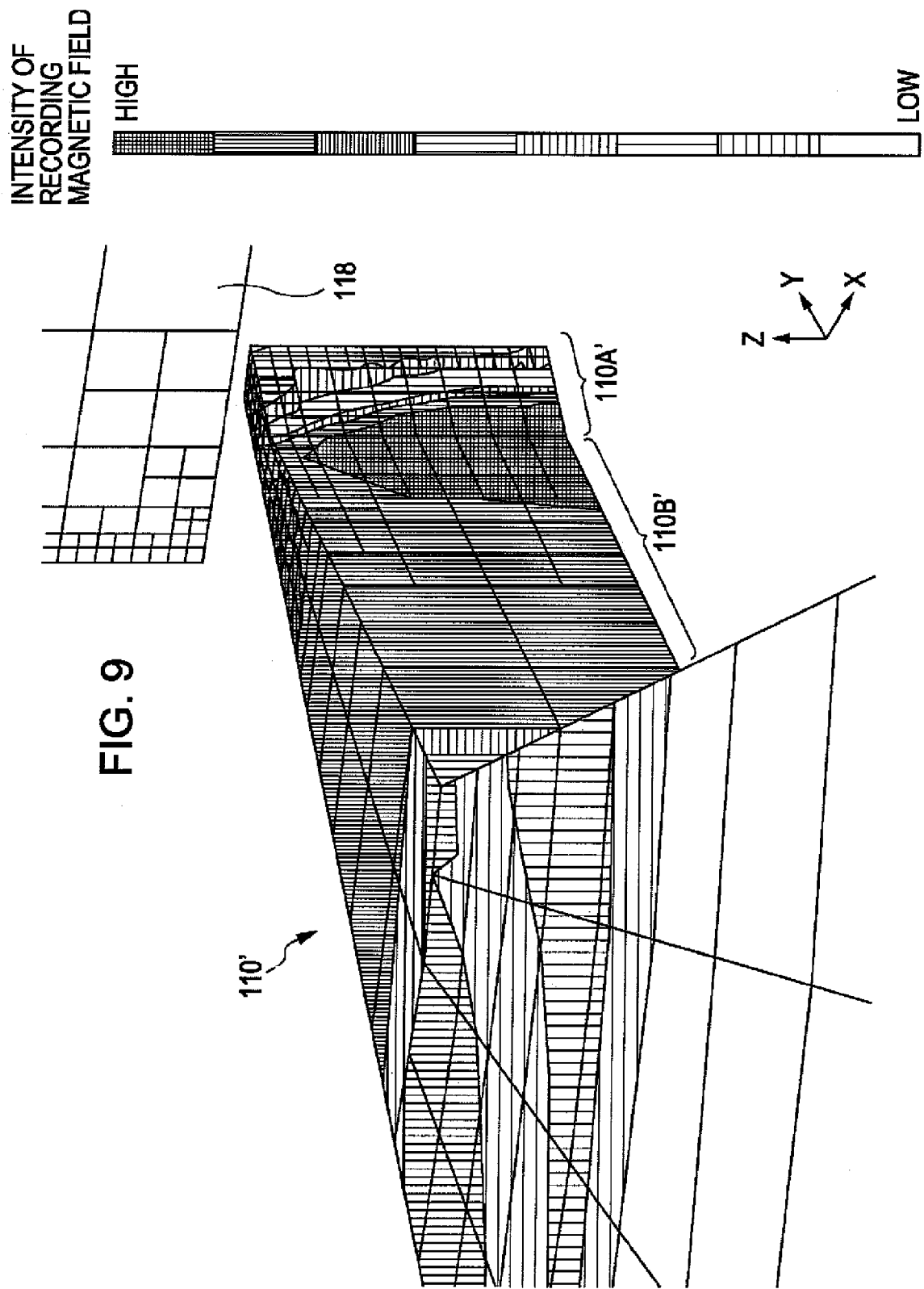

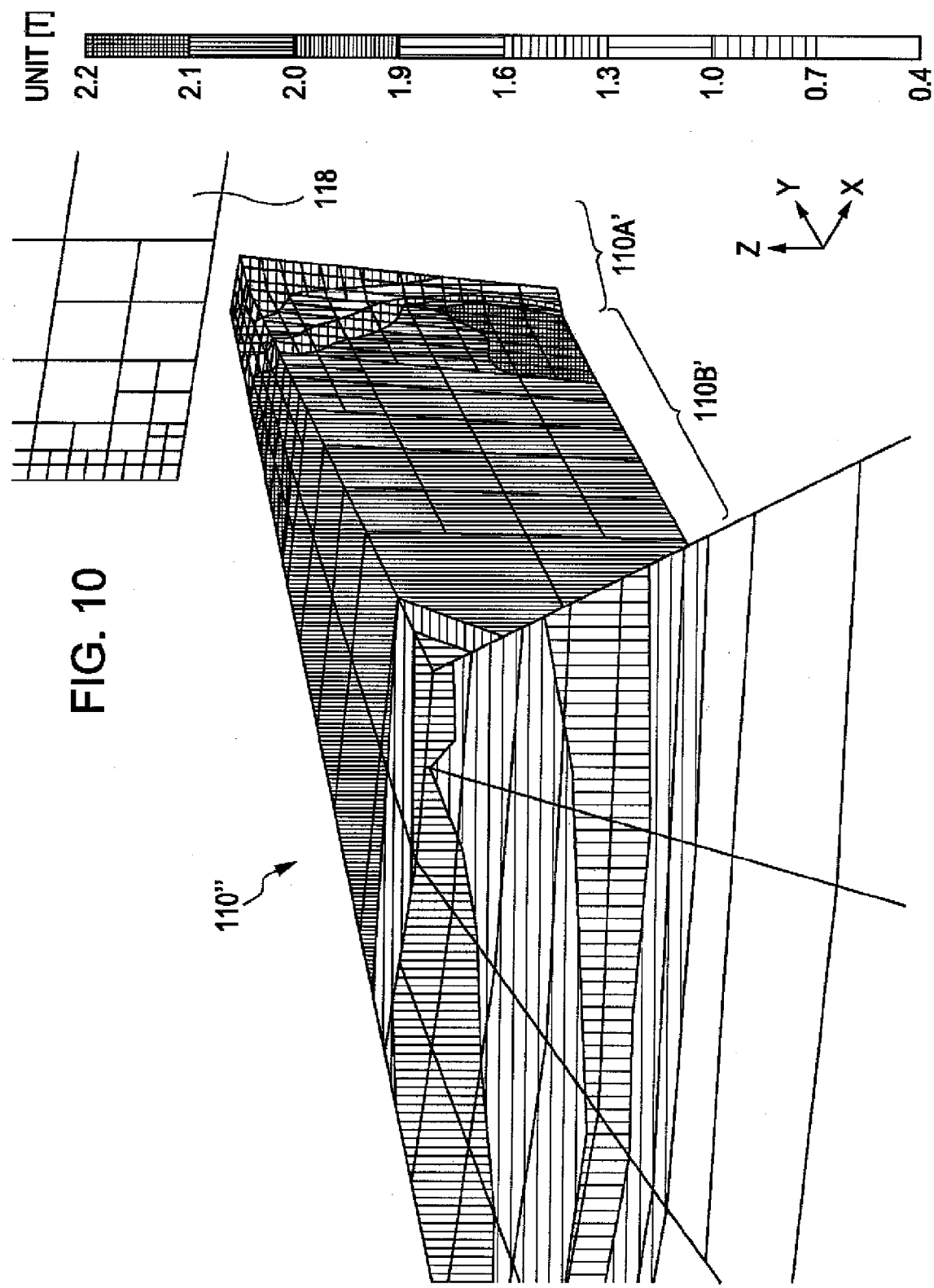

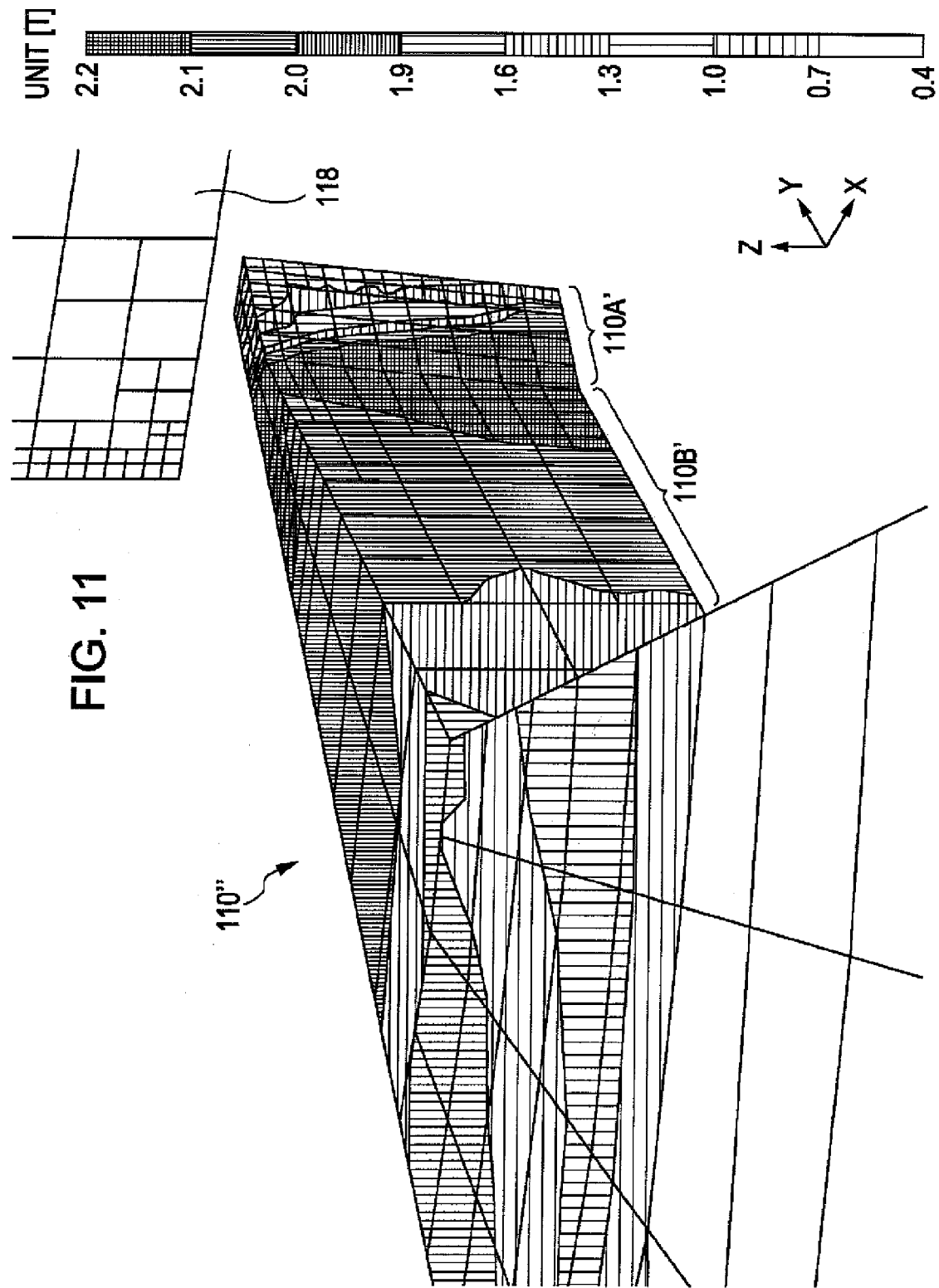

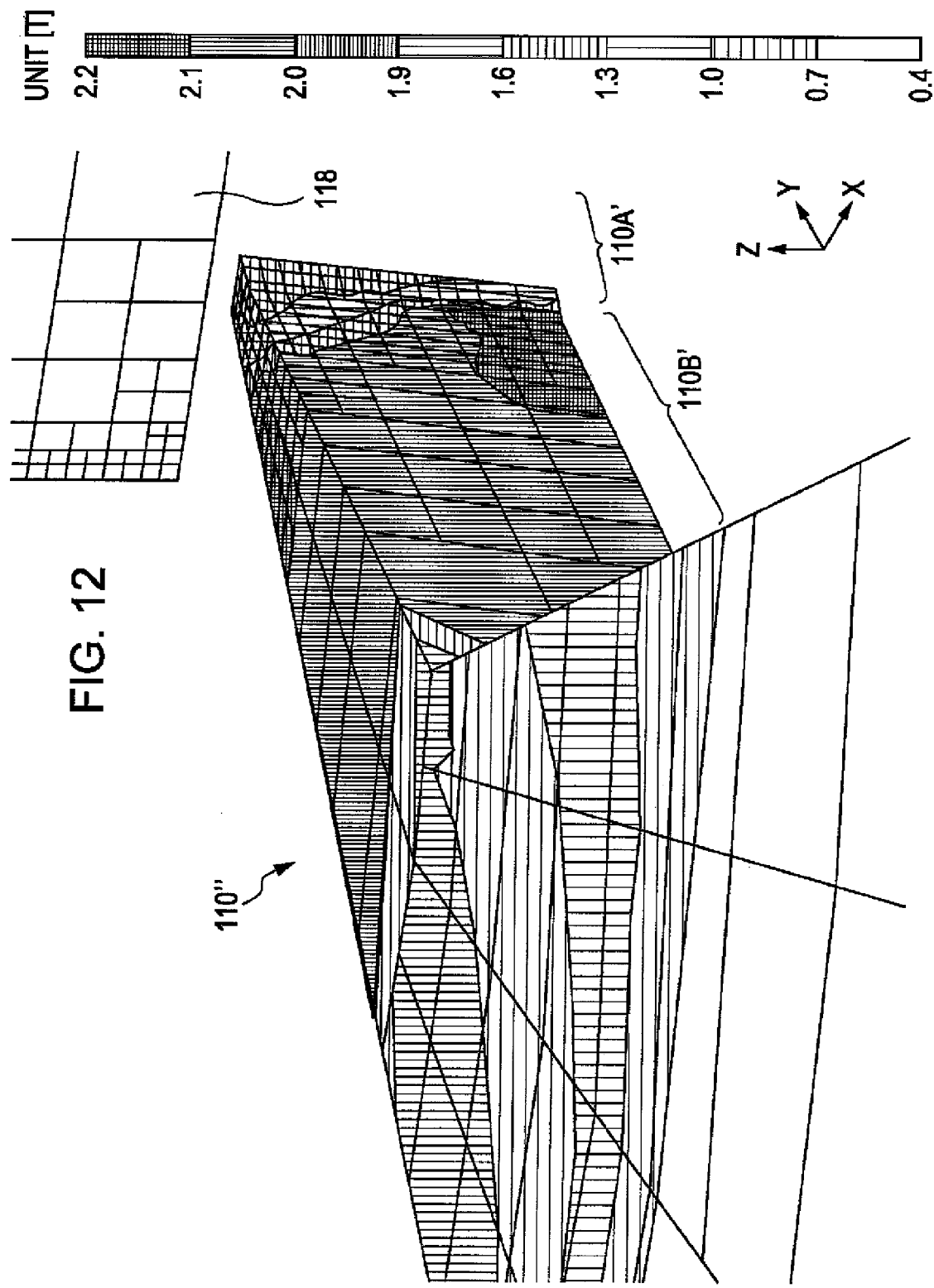

PERPENDICULAR MAGNETIC RECORDING HEAD HAVING A MAIN MAGNETIC POLE LAYER WITH A TRAPEZOIDALLY SHAPED FLARED PART WITH A RATIO OF THE LENGTH OF THE LONG BASE TO THAT OF THE SHORT BASE IS EQUAL TO 1

RELATED APPLICATIONS

This application claims the benefit of priority under 35 U.S.C. §119 to Japanese Patent Application No. 2006-106558 filed on Apr. 7, 2006, which is hereby incorporated by reference in its entirety.

BACKGROUND

1. Technical Field

The present disclosure relates to a perpendicular magnetic recording head that records information by applying a perpendicular magnetic field to a recording medium.

2. Description of the Related Art

As is widely known, a perpendicular magnetic recording head has a main magnetic pole layer, a return path layer (auxiliary magnetic pole layer), and a coil layer that provides a recording magnetic field to the main magnetic pole layer and the return path layer. The main magnetic pole layer and the return path layer are laminated with a nonmagnetic layer therebetween and form a surface that opposes a recording medium (hereinafter this surface is referred to as "recording medium-opposing surface"). The area of the main magnetic pole layer exposed in the recording medium-opposing surface is sufficiently smaller than the area of the return path exposed in the recording medium-opposing surface, and the main magnetic pole layer is magnetically coupled to the return path layer at the side remote from the recording medium-opposing surface in the height direction. The main magnetic pole layer includes a pole straight part exposed in the recording medium-opposing surface and a flared part that connects to the back end of the pole straight part in the height direction. Once electricity is supplied to the coil layer, a recording magnetic field is induced between the main magnetic pole layer and the return path layer and enters a hard film of the recording medium in a perpendicular fashion from the front end surface of the main magnetic pole layer exposed in the recording medium-opposing surface. The recording magnetic field passes through a soft film of the recording medium to thereby complete magnetic recording on the recording medium in the portion that opposes the main magnetic pole layer.

According to a proposal regarding a perpendicular magnetic recording head, the pole straight part (the portion that is exposed in the recording medium-opposing surface) of the main magnetic pole layer formed on the nonmagnetic layer is rendered a trapezoidal shape (bevel shape) narrowed at the nonmagnetic insulating layer-side when viewed from the recording medium-opposing surface-side. This is to increase the recording density and to prevent generation of fringing at the time of skew. A perpendicular magnetic recording head having such a trapezoidal pole straight part is disclosed in Japanese Unexamined Patent Application Publication No. 2002-197611, US2003021063 A1 and US 2003112555 A1.

However, even when the cross-sectional shape of the pole straight part of the main magnetic pole layer is rendered a trapezoidal shape, the magnetic flux heading toward the recording medium from the pole straight part broadens in the track-width direction under a high recording magnetic field, and the side fringe width is increased thereby. The increase in side fringe width may lead to deletion of information magnetically recorded on a track adjacent to the track on which the recording is currently carried out, which is a problem. In the related art, the intensity of the recording magnetic field is controlled not to exceed a certain level to keep, the side fringe width small, but this is disadvantageous for increasing the recording density.

SUMMARY

The present disclosure is made to overcome at least the existing problems described above. An object of the present disclosure is to provide a perpendicular magnetic recording head which can inhibit the increase in side fringe width and achieved higher recording density.

The present disclosure has been completed on the basis of the finding that the leakage magnetic field generated from the flared part of the main magnetic pole layer increases with an increase in intensity of the recording magnetic field and that this leakage magnetic field from the flared part is the cause of an increase in the side fringe width.

The present disclosure provides a perpendicular magnetic recording head that includes a nonmagnetic insulating layer and a main magnetic pole layer disposed on the nonmagnetic insulating layer. The main magnetic pole layer includes a pole straight part exposed in an opposing surface opposite a recording medium, and a flared part that extends from the pole straight part in a height direction. The flared part broadens in a track width direction as the flared part extends in the height direction. A return path layer opposes the main magnetic pole layer with a nonmagnetic layer therebetween, the return path layer being exposed in the opposing surface. The pole straight part of the main magnetic pole layer as viewed from the opposing surface has a trapezoidal shape over its entire length, the trapezoidal shape being narrowed at the nonmagnetic insulating layer-side, and the flared part as viewed from the opposing surface has a trapezoidal shape at least at a junction with the pole straight part, the trapezoidal shape being narrowed at the nonmagnetic insulating layer-side.

The flared part may have the same cross-sectional shape as the trapezoidal shape of the pole straight part at the junction between the flared part and the pole straight part.

It is practical to have the trapezoidal shape of the flared part changing as the flared portion extends in the height direction from the junction with the pole straight part such that a ratio of a length of a long base of the trapezoid to a length of a short base of the trapezoid is equal to 1.

According to the present disclosure, a leakage magnetic field from the flared part of the main magnetic layer can be reduced by beveling. Thus, occurrence of side fringing can be prevented, and a perpendicular magnetic recording head that can attain higher recording density can be provided.

BRIEF DESCRIPTION OF THE DRAWINGS

FIG. 4A shows the case without beveling and FIG. 4B shows the case with beveling.

FIG. 8 shows simulation results of Comparative Example 1 indicating the recording magnetic field intensity distribution of a sample with a small neck height Nh (Nh=0.05 μm).

FIG. 9 shows simulation results of Comparative Example 1 indicating the recording magnetic field intensity distribution of a sample with a large neck height Nh (Nh=0.15 μm)

FIG. 10 shows simulation results of Comparative Example 2 indicating the recording magnetic field intensity distribution of a sample with a small neck height Nh (Nh=0.05 μm).

FIG. 11 shows simulation results of Comparative Example 2 indicating the recording magnetic field intensity distribution of a sample with a large neck height Nh (Nh=0.15 μm)

FIG. 12 shows simulation results of Example 1 indicating the recording magnetic field intensity distribution of a sample with a small neck height Nh (Nh=0.05 μm).

DETAILED DESCRIPTION OF THE PREFERRED EMBODIMENTS

The present disclosure will now be described with reference to drawings, covering various non-exhaustive embodiments. In each of the drawings, the X direction is the track-width direction, the Y direction is the height direction, and the Z direction is the lamination direction in which the layers constituting a perpendicular magnetic recording head H are laminated, or the moving direction of a recording medium M.

Figure 1:
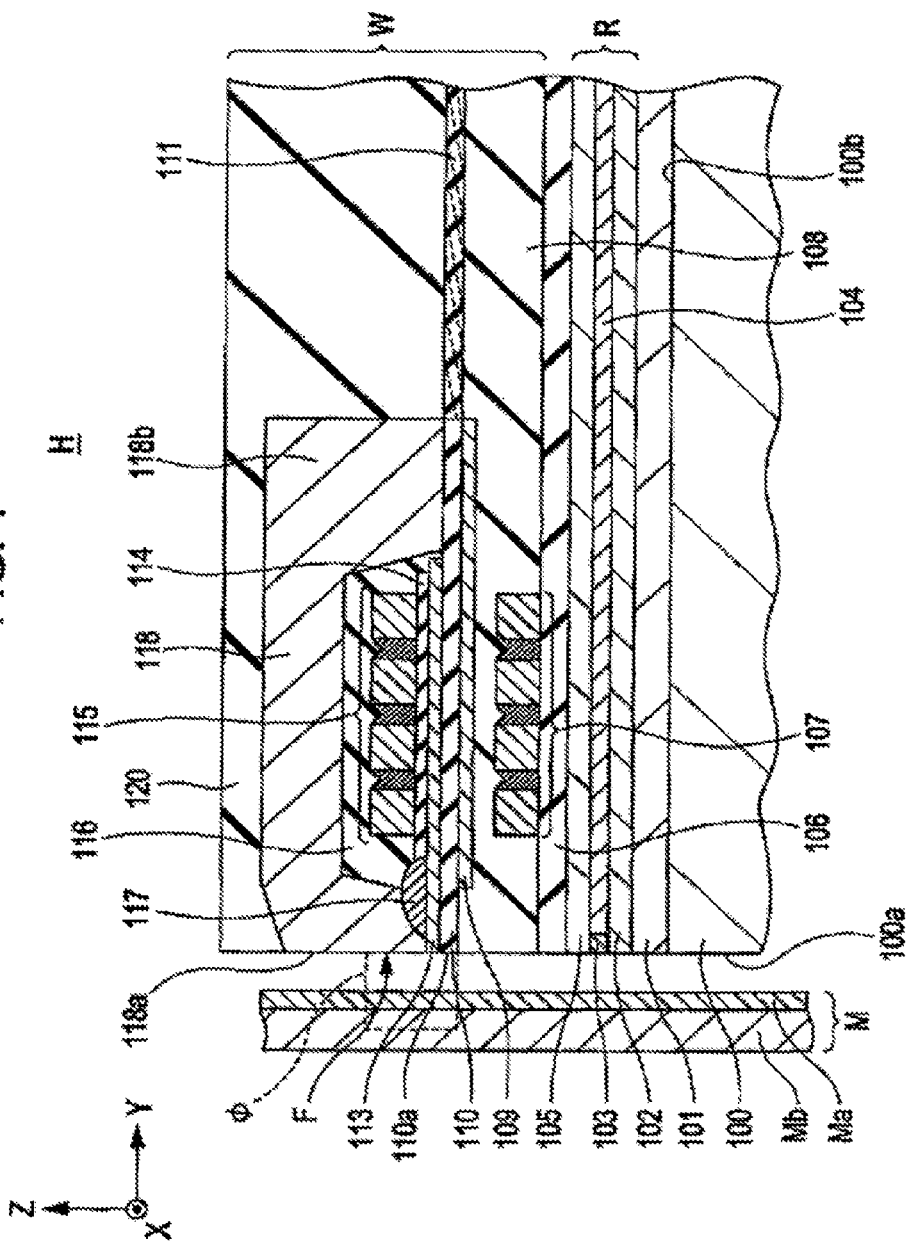
FIG. 1 is a cross-sectional view showing a part of a laminated structure of a perpendicular magnetic recording head according to one embodiment of the present disclosure as viewed in the track width direction.

FIG. 1 is a cross-sectional view showing a part of a laminated structure of a perpendicular magnetic recording head H according to one embodiment of the present disclosure as viewed in the track width direction. The perpendicular magnetic recording head H includes a read section R constituted from thin films laminated on a trailing side-end surface 100b of a slider 100, and a write section W. Writing is conducted by applying a perpendicular magnetic field Φ to the recording medium M to thereby magnetize a hard film Ma of the recording medium M in the perpendicular direction. The recording medium M includes the hard film Ma with a higher residual magnetization at the surface-side and a soft film Mb with a higher magnetic permeability at the inner side of the hard film Ma. The recording medium M is, for example, disk-shaped and is rotated about the center of the disk, which serves as the axis of rotation. The photosensitive drum (100) is composed of a nonmagnetic material such as $Al_2O_3$.TiC and a medium-opposing surface 100a of slider 100 opposes the recording medium M. As the recording medium M is rotated, the slider 100 floats up from the surface of the slider 100 by the airflow on the surface.

A nonmagnetic insulating layer 101 composed of an inorganic material such as $Al_2O_3$ or $SiO_2$ is formed on the trailing side-end surface 100b of the slider 100. The read section R is formed on the nonmagnetic insulating layer 101. The read section R includes a lower shield layer 102, an upper shield layer 105, an inorganic insulating layer (gap insulating layer) 104 that fills the space between the lower shield layer 102 and the inorganic insulating layer 104, and a read element 103 located in the inorganic insulating layer 104. The read element 103 is a magnetoresistive (MR) element such as AMR (anisotropic), GMR (giant), and TMR (tunneling).

Lower layer coils 107 composed of a conductive material are disposed on a coil insulating underlayer 106 on the upper shield layer 105. For example, the lower layer coils 107 are composed of at least one nonmagnetic metal material selected from the group consisting of Au, Ag, Pt, Cu, Cr, Al, Ti, NiP, Mo, Pd, and Rh. Alternatively, the lower layer coils 107 may each be a laminated structure in which these nonmagnetic metal materials are laminated. A nonmagnetic insulating layer 108 is formed around the lower layer coils 107.

A main magnetic pole layer 110 and an auxiliary yoke layer 109 magnetically connected to the main magnetic pole layer 110 are formed on the nonmagnetic insulating layer 108. The auxiliary yoke layer 109 is composed of a magnetic material having a magnetic flux saturation density lower than that of the main magnetic pole layer 110 and magnetically functions as a part of the main magnetic pole layer 110. The main magnetic pole layer 110 is formed on a plating underlayer disposed on the planarized auxiliary yoke layer 109 and nonmagnetic insulating layer 108 and is composed of a ferromagnetic material having a high saturation magnetic flux density such as Ni—Fe, Co—Fe, or Ni—Fe—Co. An insulating material layer 111 is formed around the main magnetic pole layer 110, and a magnetic gap layer 113, which is nonmagnetic, is formed on the main magnetic pole layer 110. The insulating material layer 111 and the magnetic gap layer 113 are, for example, composed of a nonmagnetic insulating material such as $Al_2O_3$, $SiO_2$, or Al—Si—O.

Upper layer coils 115 are formed on a coil insulating underlayer 114 formed on the magnetic gap layer 113. As with the lower layer coils 107, the upper layer coils 115 are composed of a conductive material. The upper layer coils 115 are, for example, composed of at least one nonmagnetic metal material selected from the group consisting of Au, Ag, Pt, Cu, Cr, Al, Ti, NiP, Mo, Pd, and Rh. Alternatively, they may have a laminated structure in which these nonmagnetic metal materials are laminated.

The lower layer coils 107 and the upper layer coils 115 have X-direction-side ends electrically connected to each other such that they form a solenoid. The shape of the coil layers 107 and 115 (magnetic field-generating means) are not limited to the solenoid.

A nonmagnetic insulating layer 116 is formed around the upper layer coil 115, and a return path layer (auxiliary magnetic pole layer) 118 composed of a ferromagnetic material such as permalloy is formed over the nonmagnetic insulating layer 116 and the magnetic gap layer 113. The return path layer 118 has a front end surface 118a exposed in an opposing surface F and opposes the main magnetic pole layer 110 at this front end surface 118a with a space therebetween. The back end of the return path layer 118 in the height direction is a connecting part 118b connected to the main magnetic pole layer 110. A throat height-defining layer 117 composed of an inorganic or organic material is formed on the magnetic gap layer 113 and a predetermined distance away from the opposing surface F. The throat height of the perpendicular magnetic recording head H is defined by the distance from the opposing surface F to the front edge of the throat height-defining layer 117. The return path layer 118 is covered with a protective layer 120 composed of a nonmagnetic insulating material.

The perpendicular magnetic recording head H having the above-described structure is characterized by the cross-sectional shape of the main magnetic pole layer 110. The cross-sectional shape of the main magnetic pole layer 110 is described below with reference to FIGS. 2 through 4.

Figure 2:
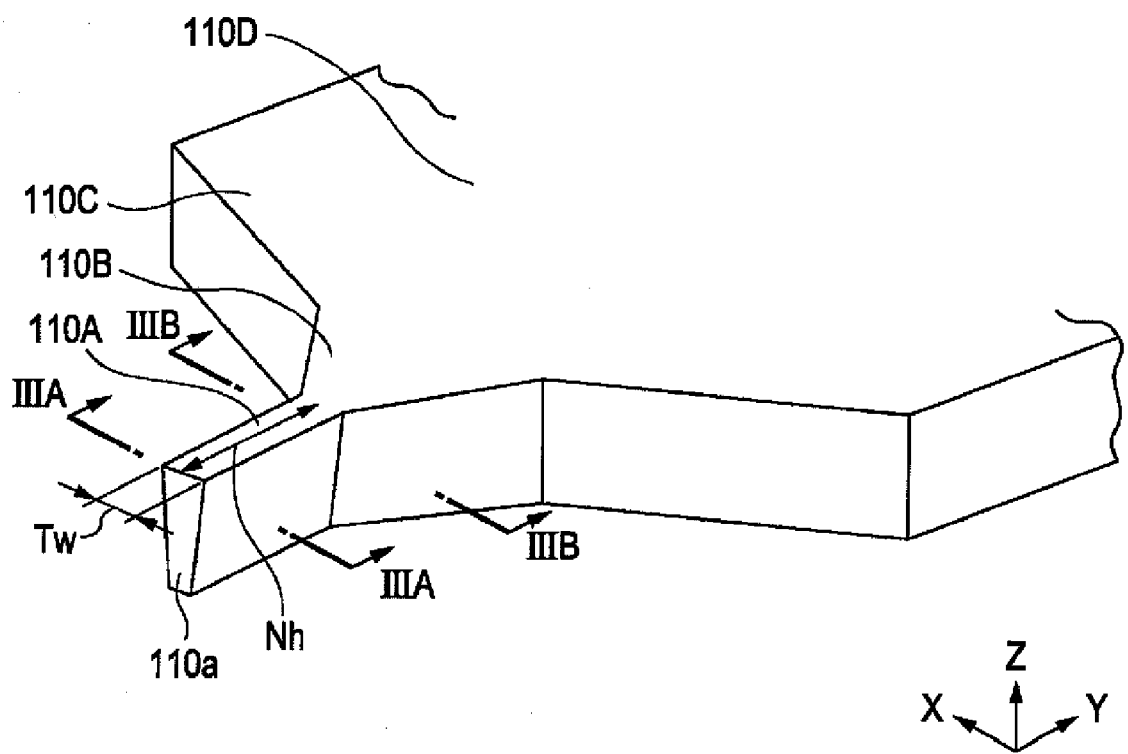
FIG. 2 is a perspective view showing a main magnetic pole layer (two-step flare structure) of FIG. 1.
Figure 3A:
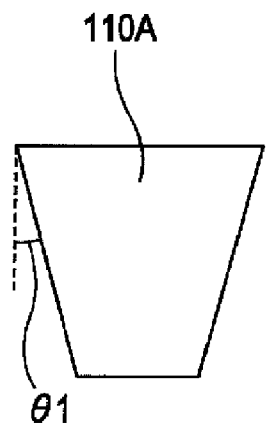
FIG. 3A is a cross-sectional view of the pole straight part taken along line IIIA-IIIA in FIGS. 2 and 5.
Figure 4A:
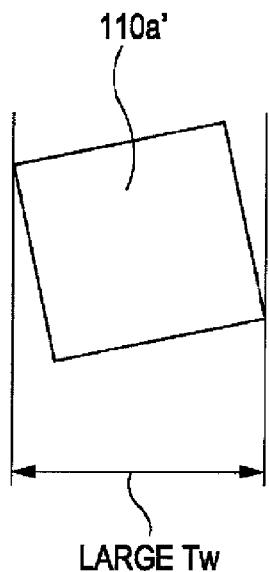
FIGS. 4A and 4B are schematic cross-sectional views explaining that the write track width Tw is decreased by beveling the pole straight part, where
Figure 4B:
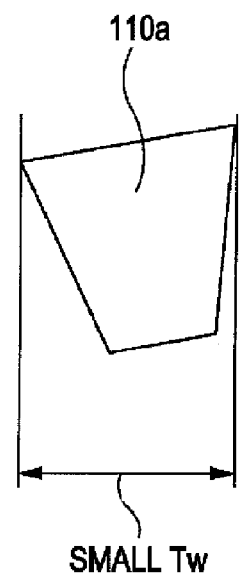

As shown in FIG. 2, the main magnetic pole layer 110 has a pole straight part 110A, a first flared part 110B, a second flared part 110C, and a base part 110D, in that order from the opposing surface F-side opposing the recording medium M. The second flared part 110C is a region for orienting the magnetic domain structures, which are generated in the base part 110D, in the track width direction during excitation. The second flared part 110C extends from the base part 110D to the first flared part 110B by gradually decreasing the width, and joins with the first flared part 110B at an angle of 40° to 70°. The first flared part 110B is a region for narrowing down the recording magnetic field from the base part 110D toward the pole straight part 110A. The dimension of the first flared part 110B in the track width direction gradually increases from the pole straight part 110A along the height direction. The pole straight part 110A forms a front surface 110a exposed in the opposing surface F opposite the recording medium M. The dimension of the pole straight part 110A in the track width direction is a predetermined write track width Tw and that in the height direction is a predetermined neck height Nh. The pole straight part 110A has a trapezoidal (beveled) cross-sectional shape over its entire length as shown in FIG. 3A. As shown in FIG. 3A, the width of the cross-sectional shape is smaller at the nonmagnetic insulating layer 108-side. By beveling the pole straight part 110A, the write track width Tw at a skew angle can be decreased when compared to the case in which the cross-sectional shape is rectangular (not beveled), as shown in FIGS. 4A and 4B.

Figure 3B:
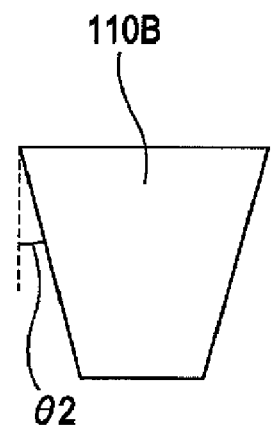
FIG. 3B is a cross-sectional view of the flared part taken along line IIIB-IIIB in FIGS. 2 and 5.

As shown in FIG. 3B, the first flared part 110B has the same shape as the pole straight part 110A, i.e., the cross-sectional shape viewed from the opposing surface F opposite the recording medium M is trapezoidal, narrowed at the nonmagnetic insulating layer 108-side. The trapezoidal shape of the first flared part 110B is coincident with that of the pole straight part 110A at the junction between the first flared part 110B and the pole straight part 110A. The cross-sectional shape of the first flared part 110B gradually changes as the first flared part 110B extends from the pole straight part 110A in the height direction such that the ratio of the long base of the trapezoid to the short base of the trapezoid becomes close to 1, and eventually the first flared part 110B joins the second flared part 110C. The cross-sectional shape at the junction between the second flared part 110C and the base part 110D is coincident with the cross-sectional shape of the base part 110D, which is rectangular (i.e., the length of the long base to the length of the short base being substantially equal to 1). In this manner, by increasing the dimension in the track width direction from the first flared part 110B to the base part 110D, magnetic domains can be appropriately controlled.

The main magnetic pole layer 110 is prepared by the following process. First, a plating underlayer is formed on the planarized auxiliary yoke layer 109 and nonmagnetic insulating layer 108, and a resist is applied over the plating underlayer. Exposure and development using an electron beam is conducted to form an open pattern for forming the main magnetic pole (i.e., the pole straight part 110A, the first flared part 110B, the second flared part 110C, and the base part 110D) in the resist layer and to expose the plating underlayer in the open pattern. Heat treatment is conducted to deform the side surface of the open pattern to form a sloped surface. Then the main magnetic pole layer 110 composed of a ferromagnetic material such as Ni—Fe, Co—Fe, Ni—Fe—Co, or the like, is formed by plating on the plating underlayer exposed in the open pattern. The resist is then removed. The pole straight part 110A, the first flared part 110B, and the second flared part 110C that has a trapezoidal cross-sectional shape narrower at the nonmagnetic insulating layer 108-side are obtained. In this embodiment, the pole straight part 110A, the first flared part 110B, and the second flared part 110C are formed simultaneously. Thus, the beveled angle θ1 of the pole straight part 110A is the same as the beveled angle θ2 of the first flared part 110B and the second flared part 110C, i.e., 8°.

Figure 5:
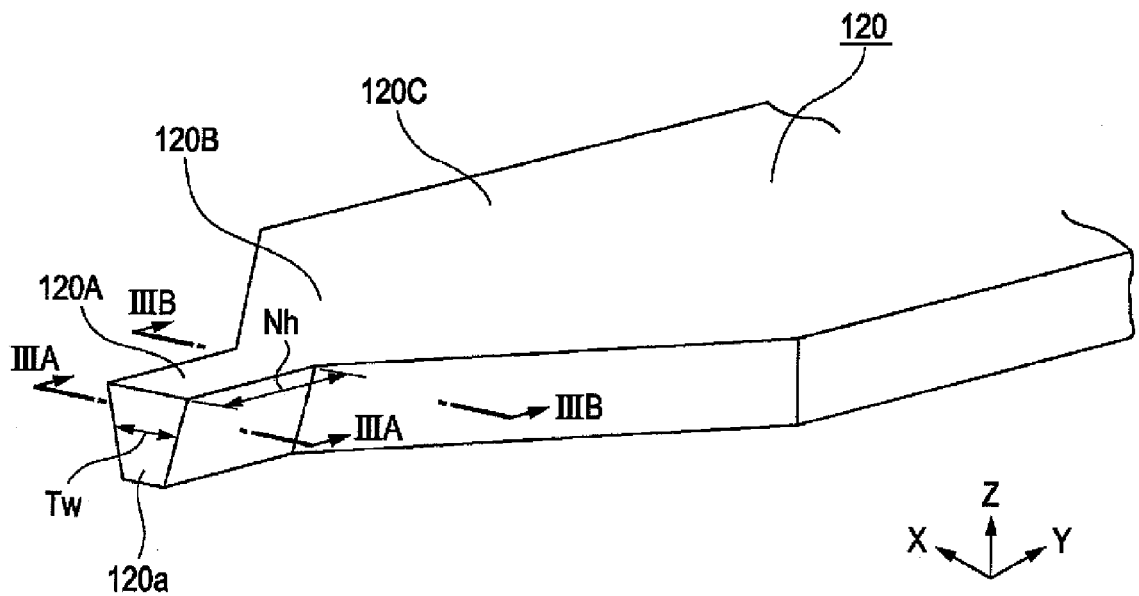
FIG. 5 is a perspective view showing a main magnetic pole layer according to another embodiment (1-step flare structure).
Figure 6A:
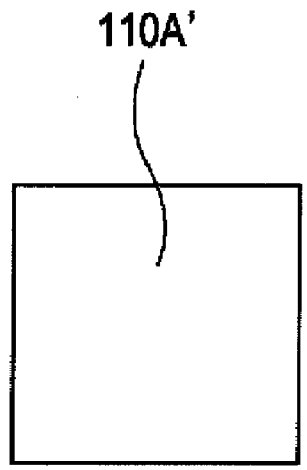
FIGS. 6A and 6B are cross-sectional views of a main magnetic pole layer of a Comparative Example 1, FIG. 6A showing a cross-sectional shape of a pole straight part not beveled and FIG. 6B showing a cross-sectional shape of a flared part not beveled.
Figure 6B:
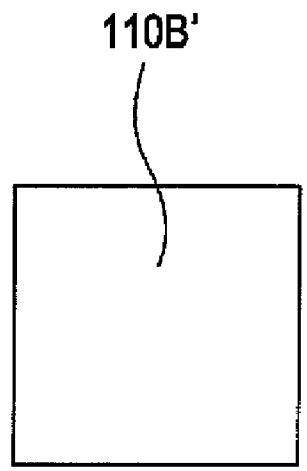

Although the main magnetic pole layer 110 of this embodiment is formed into a two-step flare structure shown in FIG. 2, the main magnetic pole layer may have a one-step flare structure shown in FIG. 5, for example, or a flare structure with three or more steps. The main magnetic pole layer 120 shown in FIG. 5 has a one step-flared structure, including a pole straight part 120A, a flared part 120B, and a base part 120C. The pole straight part 120A forms a front surface 120a exposed in the opposing surface F opposite the recording medium M. The dimension of the pole straight part 120A in the track width direction is a predetermined write track width Tw and that in the height direction is a predetermined neck height Nh. The pole straight part 120A has a trapezoidal (beveled) cross-sectional shape over its entire length as shown in FIG. 3A, as viewed from the opposing surface F. As shown in FIG. 3A, the cross-sectional shape is narrower at the nonmagnetic insulating layer 108-side.

As shown in FIG. 3B, the flared part 120B has the same shape as the pole straight part 120A, i.e., the cross-sectional shape viewed from the opposing surface F opposite the recording medium M is trapezoidal and narrower at the nonmagnetic insulating layer 108-side. The trapezoidal shape of the flared part 120B is the same as the cross-sectional shape of the pole straight part 120A at the junction between the flared part 120B and the pole straight part 120A. The cross-sectional shape gradually changes from the pole straight part 120A toward the base part 120C as the flared part 120B extends in the height direction such that the ratio of the long base to the short base of the trapezoid becomes close to 1. Eventually, the cross-sectional shape of the flared part 120B becomes the same as that of the base part 120C at the junction between the flared part 120B and the base part 120C, the cross-sectional shape at the junction being rectangular, i.e., a shape in which the ratio of the long base to the short base is close to 1.

The advantages of the present disclosure will now be described with reference to FIGS. 6A through 21 by comparing Example 1 of the present disclosure with Comparative Examples 1 and 2.

Figure 7A:
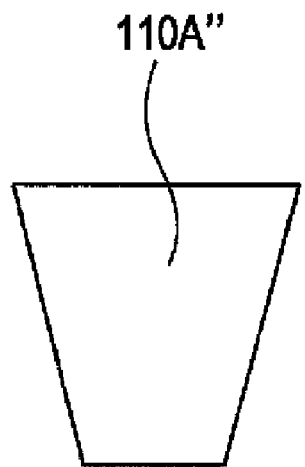
FIGS. 7A and 7B are cross-sectional views of a main magnetic pole layer of a Comparative Example 2, FIG. 7A showing a cross-sectional shape of a pole straight part beveled and FIG. 7B showing a cross-sectional shape of a flared part not beveled.
Figure 7B:
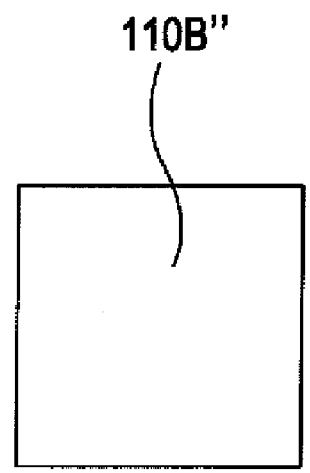

As shown in FIGS. 1 to 3B, the main magnetic pole layer 110 of Example 1 has the pole straight part 110A and the first flared part 110B that are beveled, as described above. In contrast, as shown in cross-sectional views of FIGS. 6A and 6B, a main magnetic pole layer 110' of Comparative Example 1, have a pole straight part 110A' and a flared part 110B' that are not beveled (rectangular cross-section). The cross-sectional shape of a main magnetic pole layer 110'' of Comparative Example 2 is shown in FIGS. 7A and 7B. Only the pole straight part 110A'' is beveled, and the cross-sectional shape of the first flared part 110B'' is rectangular.

Figure 13:
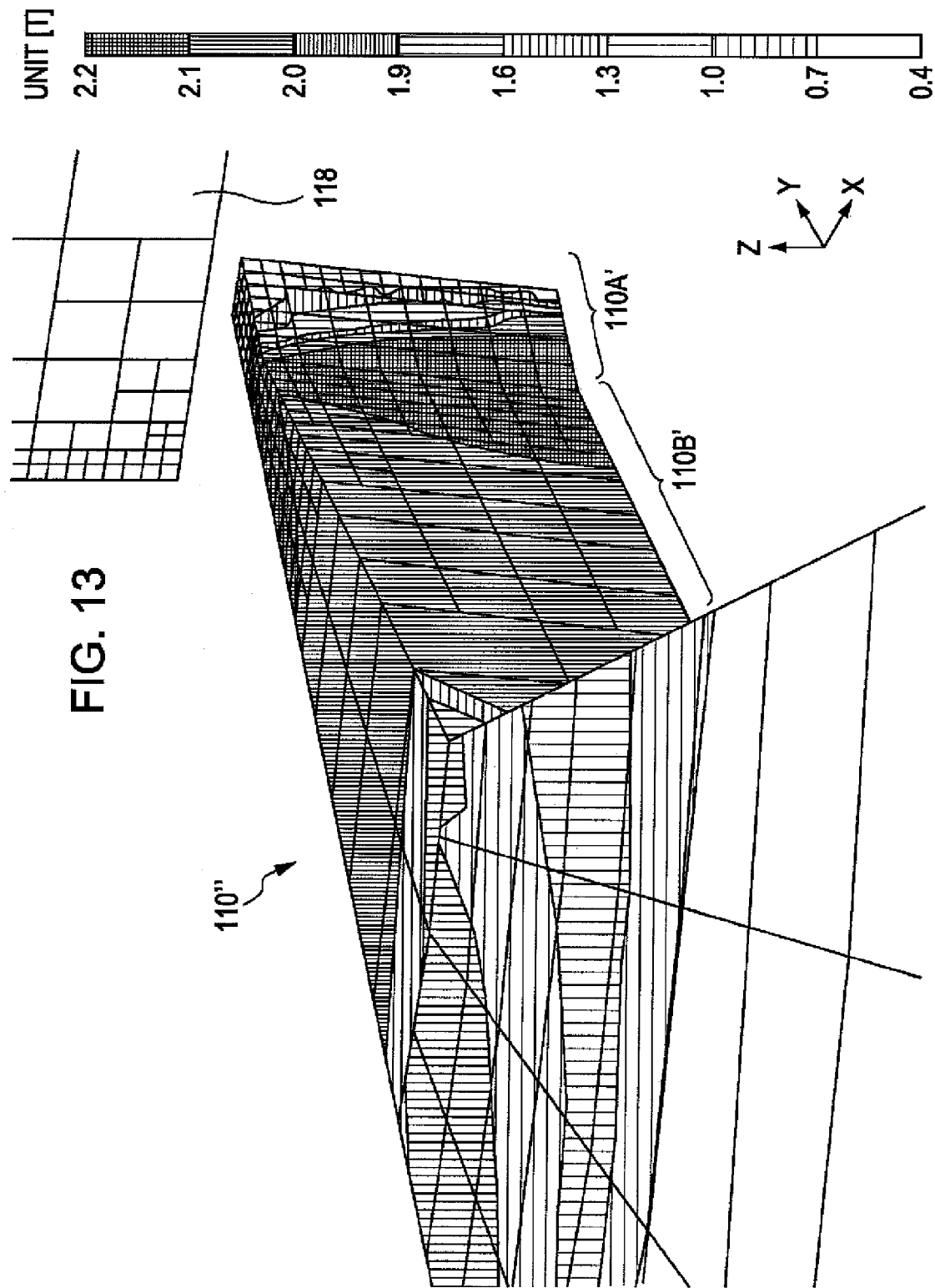
FIG. 13 shows simulation results of Example 1 indicating the recording magnetic field intensity distribution of a sample with a large neck height Nh (Nh=0.15 μm).

FIGS. 8 to 13 show simulation results of recording magnetic field intensity distribution in the main magnetic pole layer surface of samples with a small neck height Nh (Nh=0.05 μm) and samples with a large neck height Nh (Nh=0.15 μm). FIGS. 8 and 9 show the recording magnetic field intensity distribution of Comparative Example 1, and FIGS. 10 and 11 show the recording magnetic field intensity distribution of Comparative Example 2. FIGS. 12 and 13 show the recording magnetic field intensity distribution according to Example 1. In these simulations, the beveled angle θ in Example 1 and Comparative Example 2 is set to 8°.

As shown in FIGS. 8 to 13, the following equally applies for all samples. That is, the recording magnetic field intensity is the largest in the portion where the first flared part 110B is narrowed down to the pole straight part 110A near the junction between the first flared part 110B and the pole straight part 110A. The recording magnetic field intensity is larger in the lower-surface-side (leading side) than in the upper-surface-side (trailing side) of the main magnetic pole layer 110. Finally, the magnetic field intensity at the main magnetic pole layer surface increases as the neck height Nh is decreased. Here, the reason that the recording magnetic field intensity is larger in the lower-surface-side than that in the upper-surface-side of the main magnetic pole layer 110 is presumably that the magnetic flux at the upper-surface side is absorbed in the return path layer 118. Concentration of the magnetic field at the portion near the junction between the pole straight part 110A and the first flared part 110B, and in particular at the lower-surface-side, causes generation of the leakage magnetic field from the first flared part 110B. This leakage magnetic field is the cause of the increase in side fringe width.

As shown in FIGS. 8, 10, and 12 (or in FIGS. 9, 11, and 13), when the neck height Nh is the same, the recording magnetic field intensity is smaller in Comparative Example 2 in which only the pole straight part 110A' is beveled than in Comparative Example 1 in which no beveling is effected. Additionally, the recording magnetic field intensity is smaller in Example 1 in which both the pole straight part 110A and the first flared part 110B are beveled than in the Comparative Example 2. These results indicate that concentration of the magnetic field is reduced near the junction between the pole straight part 110A and the first flared part 110B by beveling. This tendency is particularly strong in the samples with a small neck height Nh, as is clear from comparison of FIGS. 8, 10, and 12 with FIGS. 9, 11, and 13.

Figure 14:
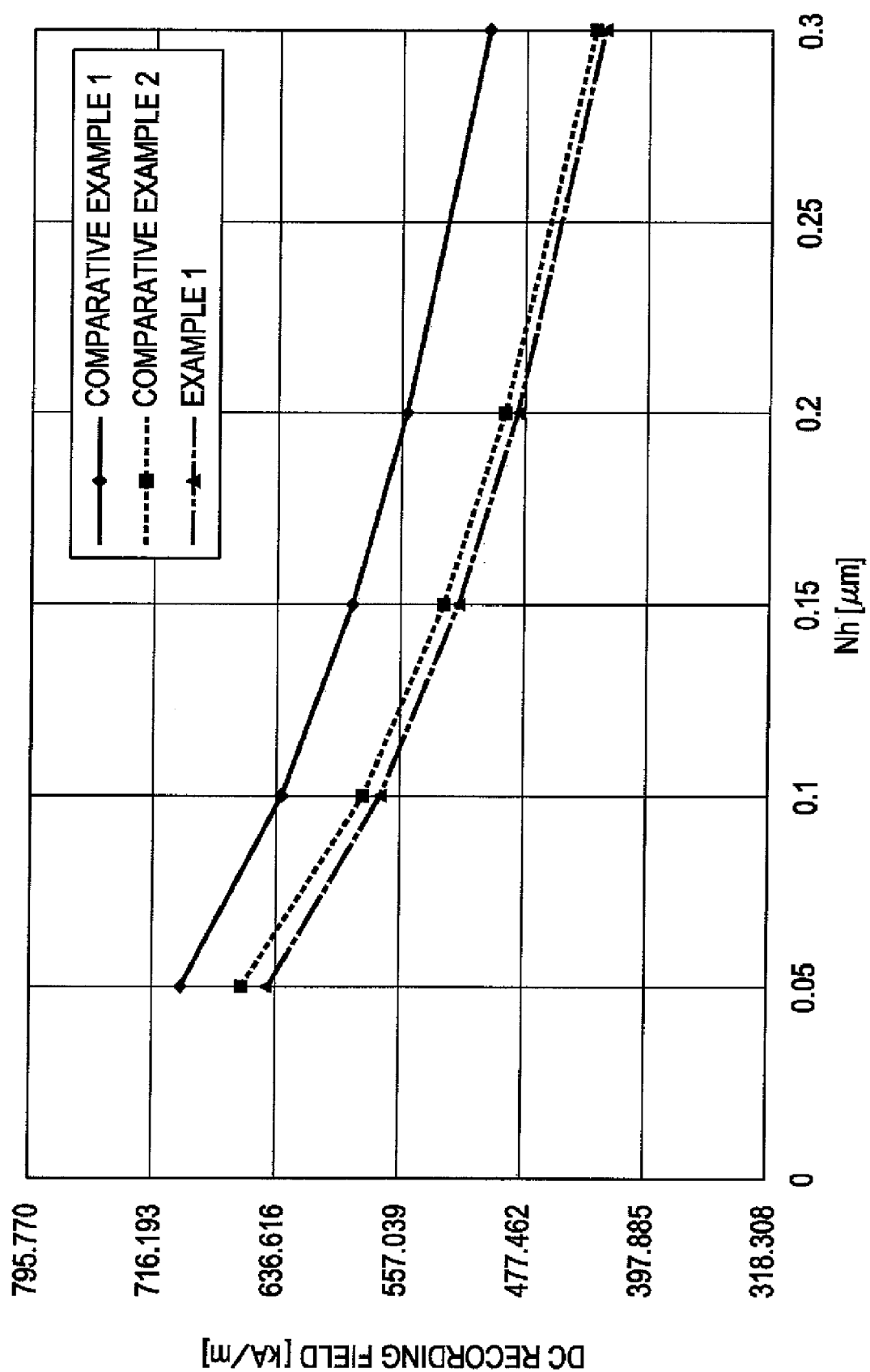
FIG. 14 is a graph showing the relationship between the neck height Nh (μm) and the recording magnetic field intensity (maximum value) in the main magnetic pole surface on the basis of the analysis of the simulation results shown in FIGS. 8 to 13.

FIG. 14 is a graph showing the relationship between the neck height Nh (μm) and the recording magnetic field intensity (maximum value) [kA/m] in the main magnetic pole surface on the basis of the analysis of the simulation results shown in FIGS. 8 to 13. As is apparent from FIG. 14, the smaller the neck height Nh, the larger the maximum value of the recording magnetic field intensity in the main magnetic pole surface. The maximum value of the recording magnetic field intensity is highest in Comparative Example 1 and is substantially the same between Comparative Example 2 and Example 1 when the neck height Nh is the same.

Figure 15:
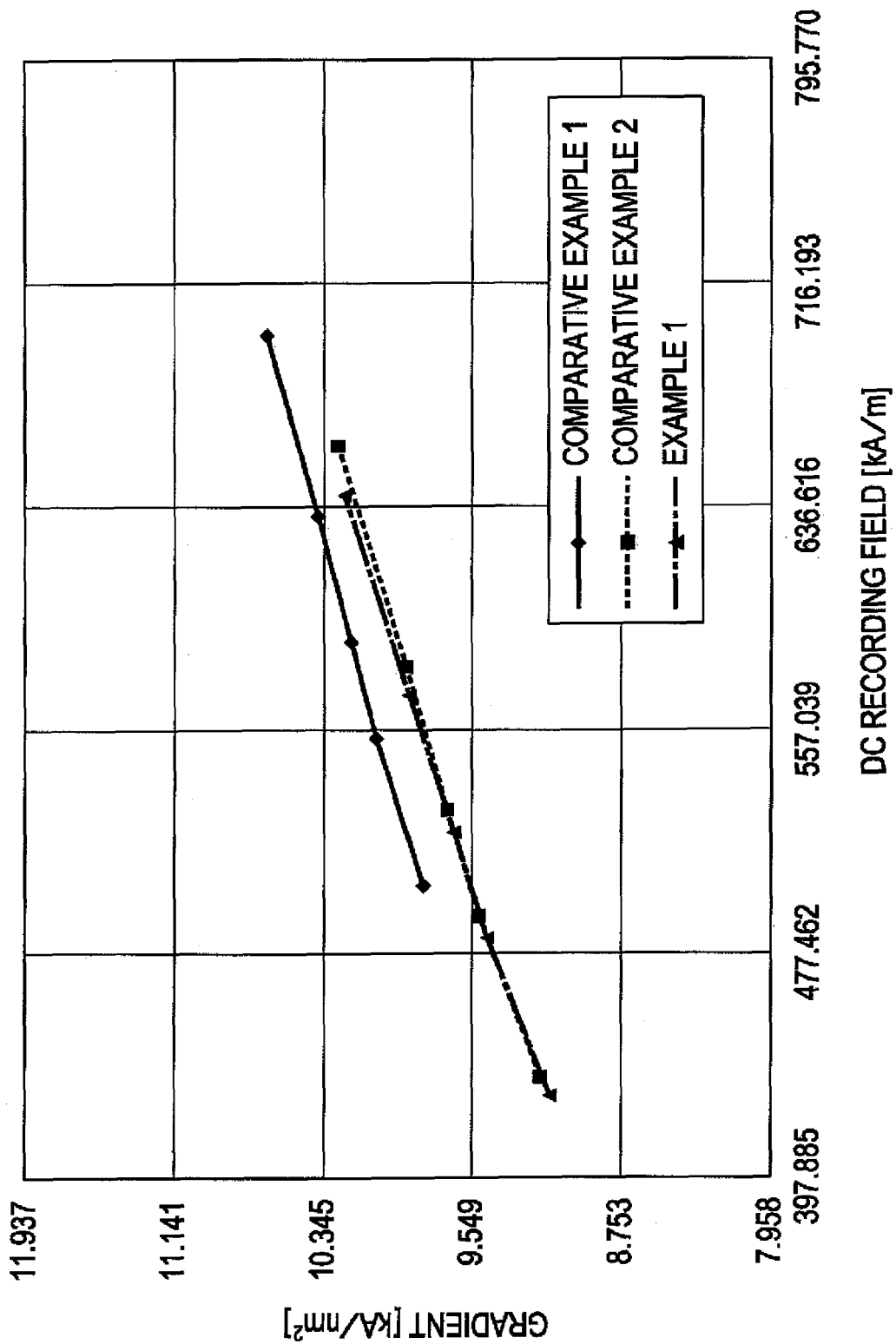
FIG. 15 is a graph showing the relationship between the recording magnetic field intensity (maximum value) in the main magnetic pole surface and the recording magnetic field gradient on the basis of the analysis of the simulation results shown in FIGS. 8 to 13.

FIG. 15 is a graph showing the relationship between the recording magnetic field intensity (maximum value) [kA/m] in the main magnetic pole surface and the recording magnetic field gradient [A/nm$^2$] on the basis of the analysis of the simulation results shown in FIGS. 8 to 13.

As is apparent from FIG. 15, the recording magnetic field gradient is in proportion to the recording magnetic field intensity. The recording magnetic field intensity increases with the recording magnetic field gradient. When the recording magnetic field intensity is the same, the recording magnetic field gradient is the largest in Comparative Example 1 and is substantially the same between Comparative Example 2 and Example 1. In Comparative Examples 1 and 2 and in Example 1, the rate of change in-recording magnetic field gradient against the recording magnetic field intensity is substantially the same.

Figure 16:
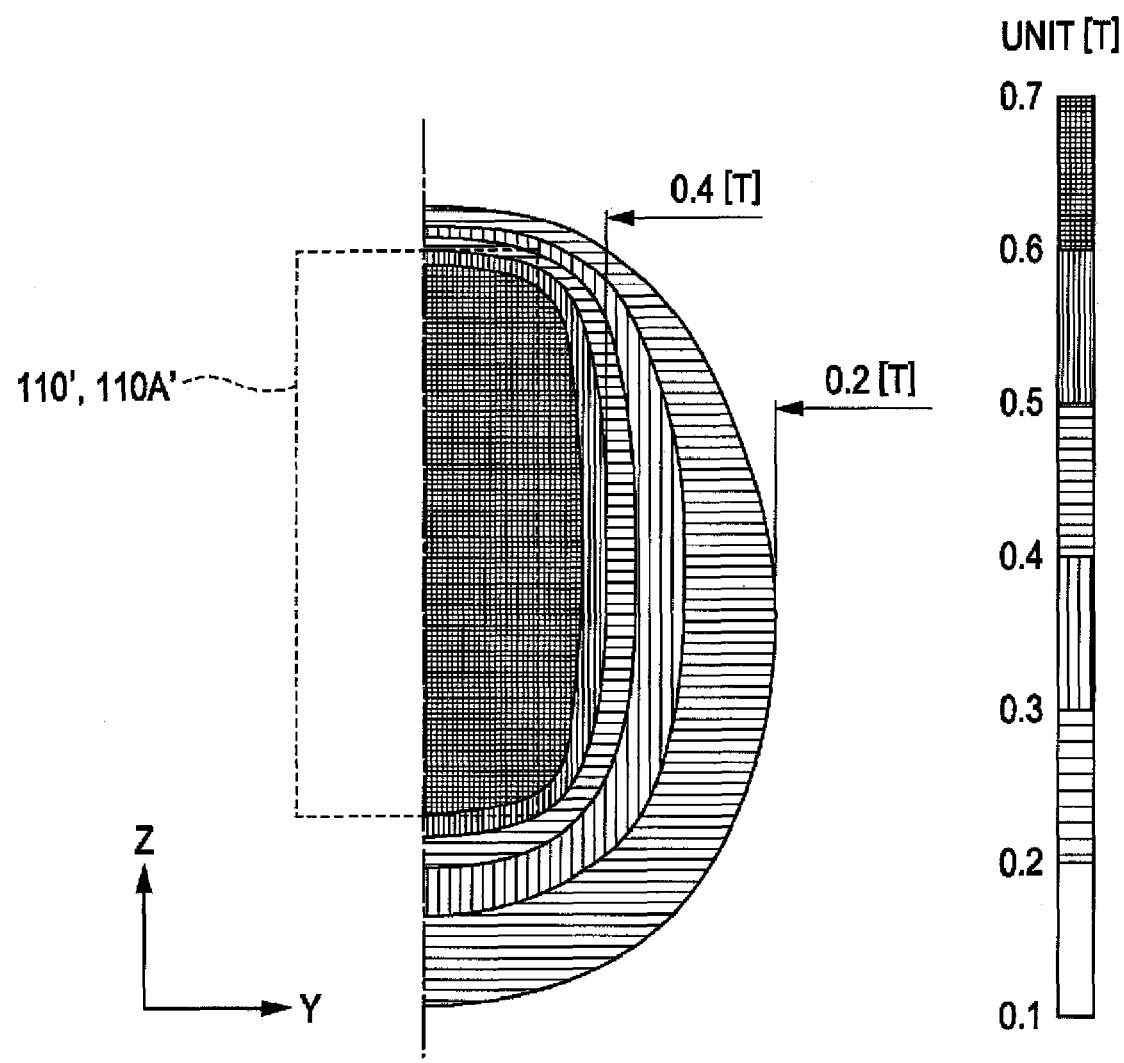
FIG. 16 shows simulation results of Comparative Example 1 of a sample with a small neck height Nh (Nh=0.05 m), indicating the recording magnetic field intensity distribution at a position corresponding to the center of the recording medium in the thickness direction.
Figure 17:
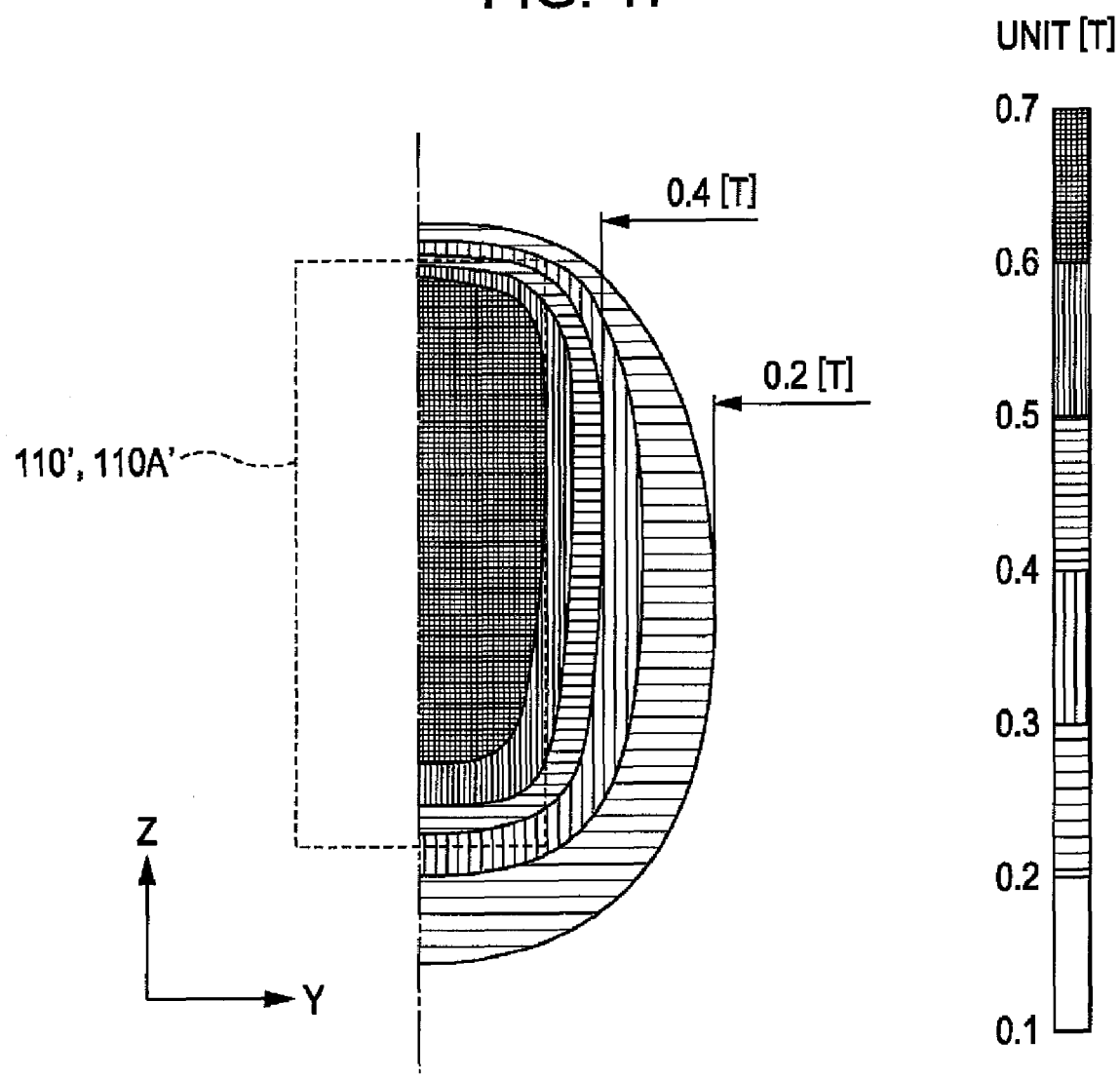
FIG. 17 shows simulation results of Comparative Example 1 of a sample with a large neck height Nh (Nh=0.15 μm), indicating the recording magnetic field intensity distribution at a position corresponding to the center of the recording medium in the thickness direction.
Figure 18:
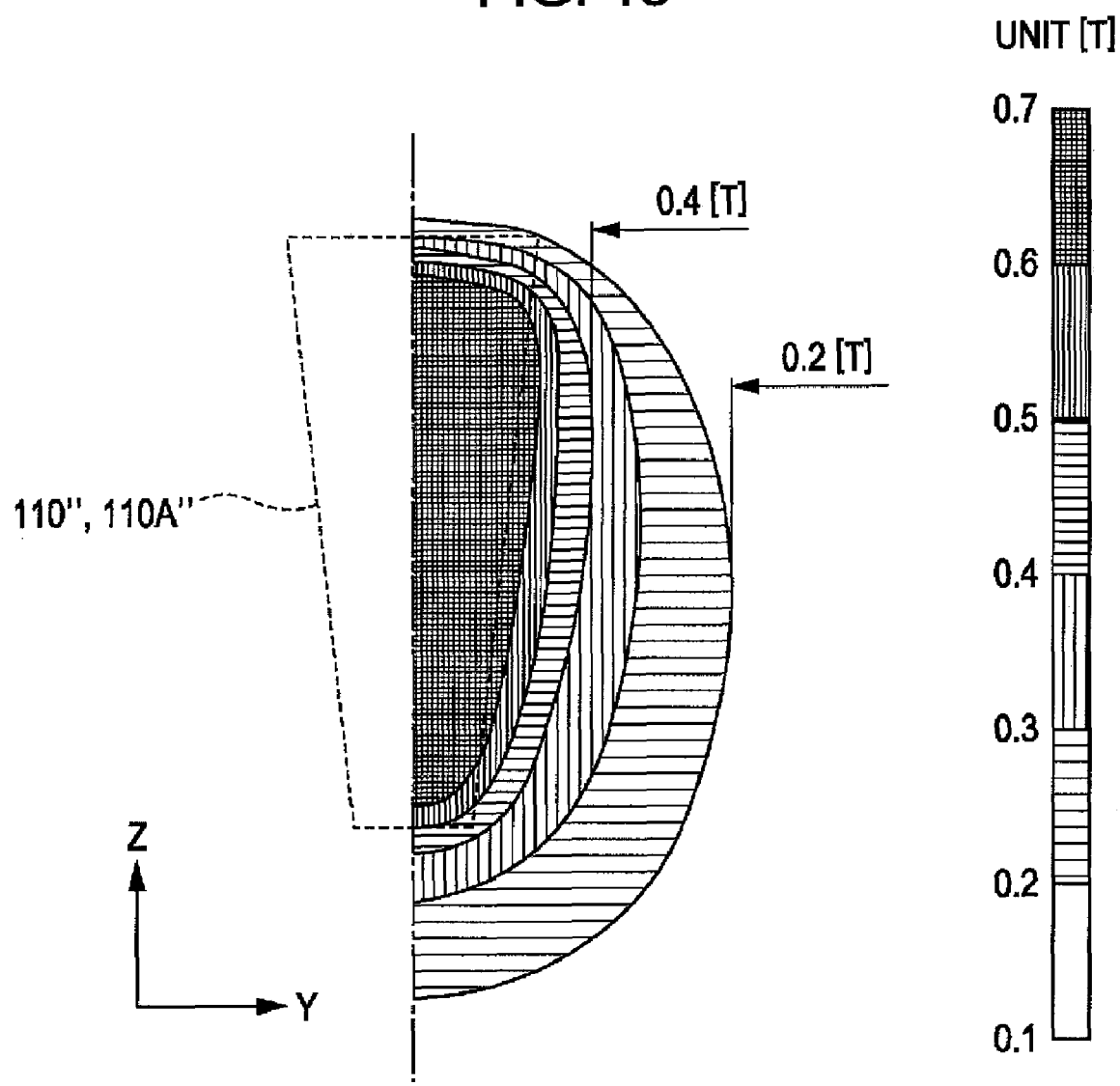
FIG. 18 shows simulation results of Comparative Example 2 of a sample with a small neck height Nh (Nh=0.05 μm), indicating the recording magnetic field intensity distribution at a position corresponding to the center of the recording medium in the thickness direction.
Figure 19:
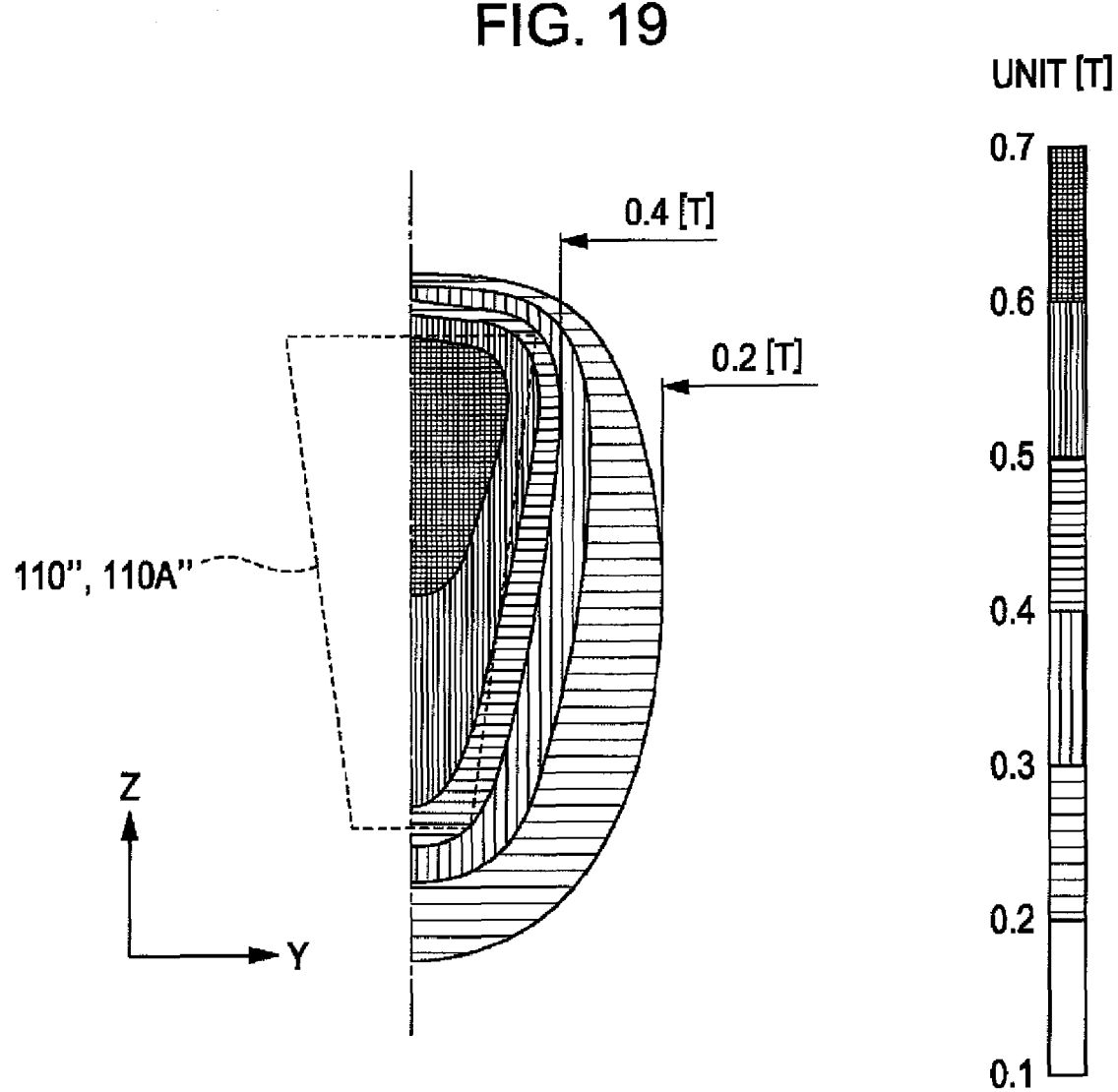
FIG. 19 shows simulation results of Comparative Example 2 of a sample with a large neck height Nh (Nh=0.15 μm) indicating the recording magnetic field intensity distribution at a position corresponding to the center of the recording medium in the thickness direction.
Figure 20:
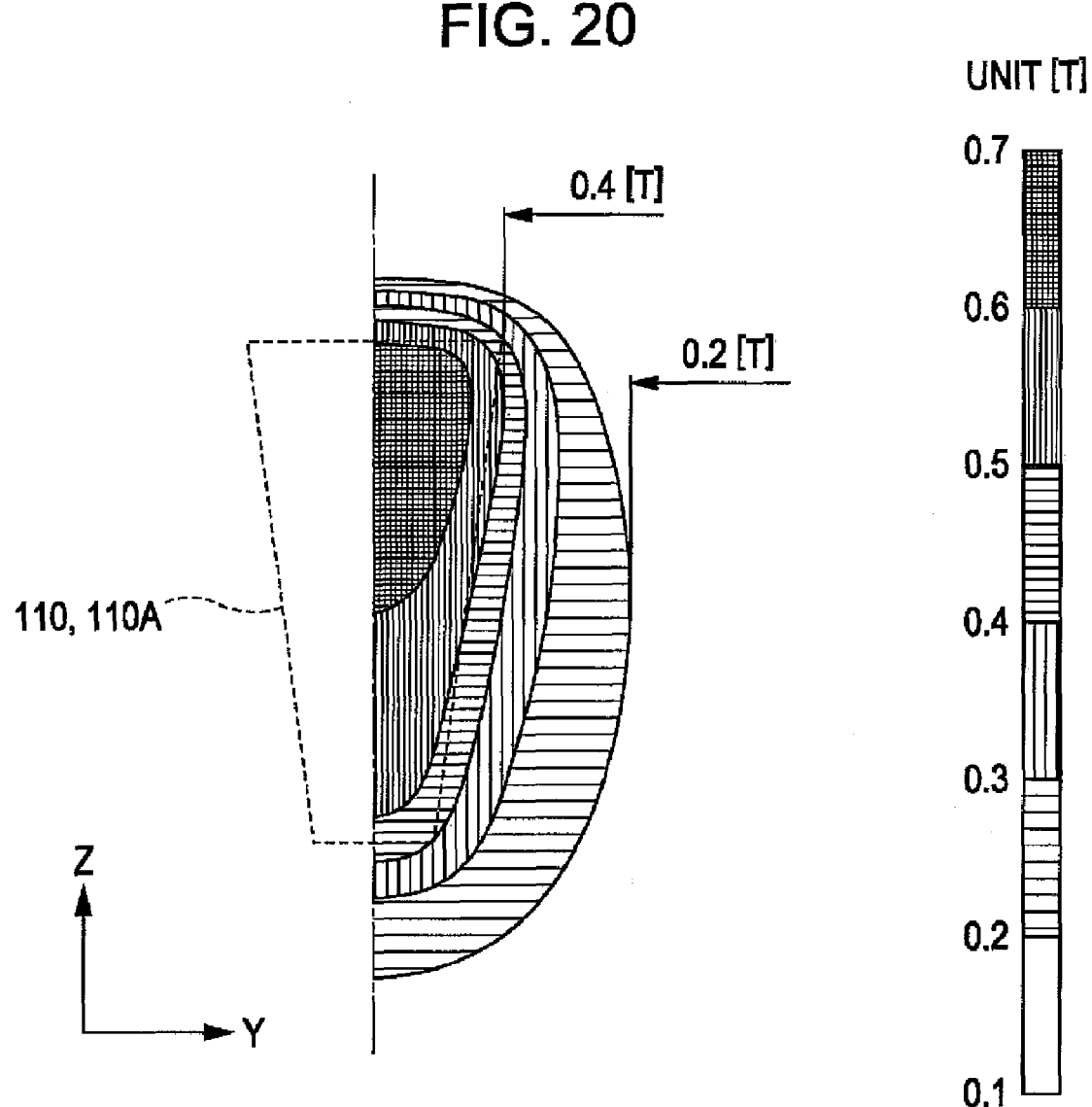
FIG. 20 shows simulation results of Example 1 of a sample with a small neck height Nh (Nh=0.05 μm), indicating the recording magnetic field intensity distribution at a position corresponding to the center of the recording medium in the thickness direction.
Figure 21:
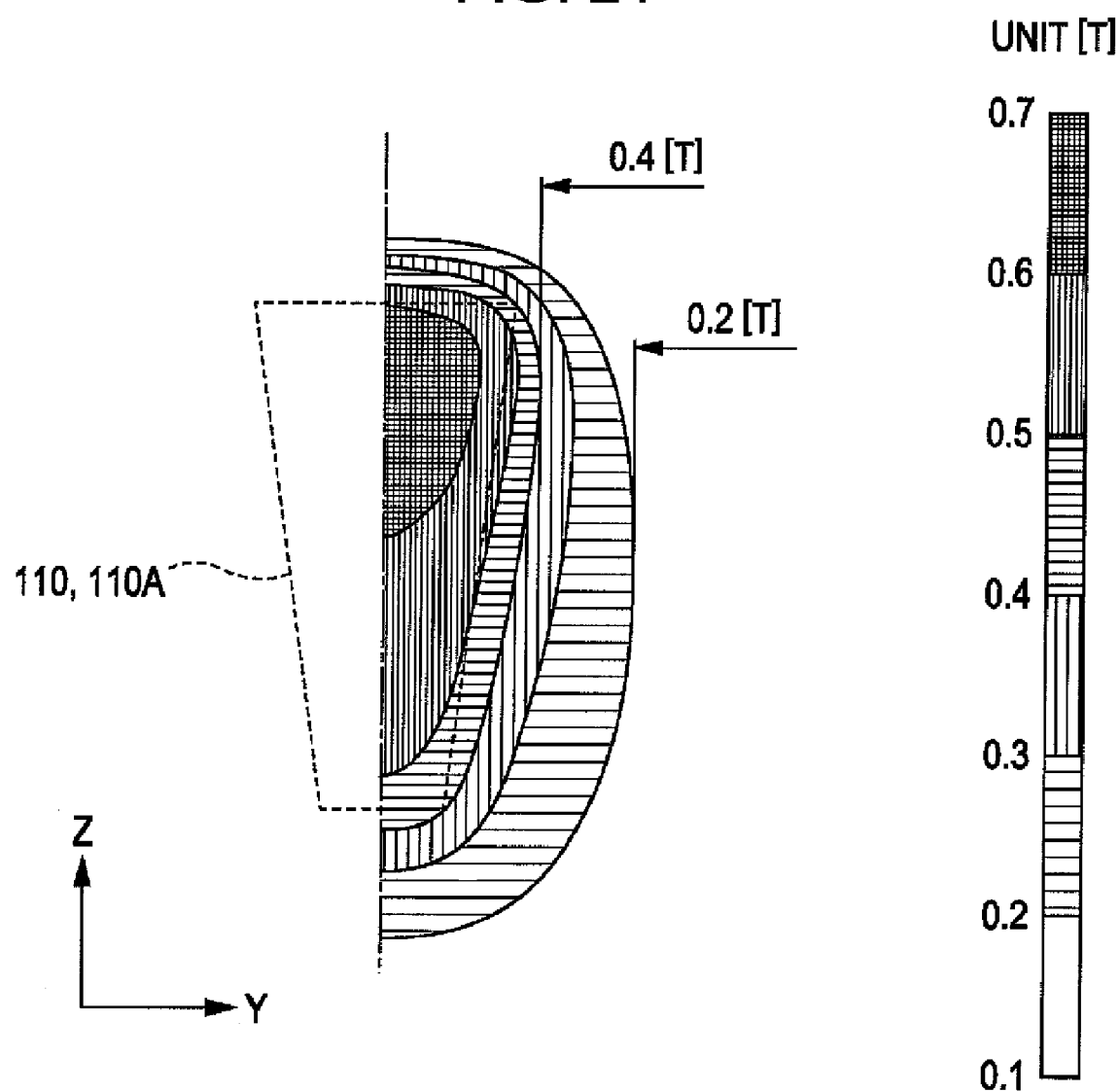
FIG. 21 shows simulation results of Example 1 of a sample with a large neck height Nh (Nh=0.15 μm), indicating the recording magnetic field intensity distribution at a position corresponding to the center of the recording medium in the thickness direction.

FIGS. 16 to 21 show simulation results of recording magnetic field intensity distribution at a position corresponding to the center of the recording medium in the thickness direction in samples with a small neck height Nh (Nh=0.05 nm) and samples with a large neck height Nh (Nh=0.15 μm) according to Comparative Examples 1 and 2 and Example 1. FIGS. 16 and 17 show the recording magnetic field intensity distributions of Comparative Example 1, and FIGS. 18 and 19 show the recording magnetic field intensity distributions of Comparative Example 2. FIGS. 20 and 21 show the recording magnetic field intensity distributions of Example 1.

FIGS. 16 through 21 show that all examples tend to have a recording magnetic field intensity distribution broadening at a position opposing the lower-surface side of the main magnetic pole layer when compared with that at a position opposing the upper-surface-side of the main magnetic pole layer. In particular, in Comparative Example 1, as shown in FIGS. 16 and 17, the region with the highest recording magnetic field intensity has a rectangular shape substantially the same as the cross-sectional shape of the main magnetic pole layer 110', which yields a teardrop-shaped recording magnetic field intensity distribution broadening at the lower-surface-side as a whole. In contrast, in Comparative Example 2 and Example 1, as shown in FIGS. 18 to 21, the region with the highest recording magnetic field intensity has an inverted trapezoidal shape corresponding to the cross-sectional shape of the main magnetic pole layers 110" and 110, which yields an elongated egg-shaped recording magnetic field intensity distribution as a whole.

As shown in FIGS. 16, 18, and 20 (or in FIGS. 17, 19, and 21), when the neck height Nh is the same, broadening of the recording magnetic field intensity, i.e., the broadening at a position opposing the lower-surface-side of the main magnetic pole layer, is inhibited to a larger extent in Comparative Example 2 than in Comparative Example 1, and broadening of the recording magnetic field intensity is inhibited to a larger extent in Example 1 than in Comparative Example 2. This tendency is particularly strong in samples with a smaller neck height Nh, as is clear from comparison of FIGS. 16, 18, and 20 with FIGS. 17, 19, and 21. Since the neck height Nh is proportional to the recording magnetic field intensity as described above, broadening of the magnetic flux at a position opposing the lower-surface-side of the main magnetic pole layer is inhibited to a greater extent as the recording magnetic field intensity increases.

Figure 22:
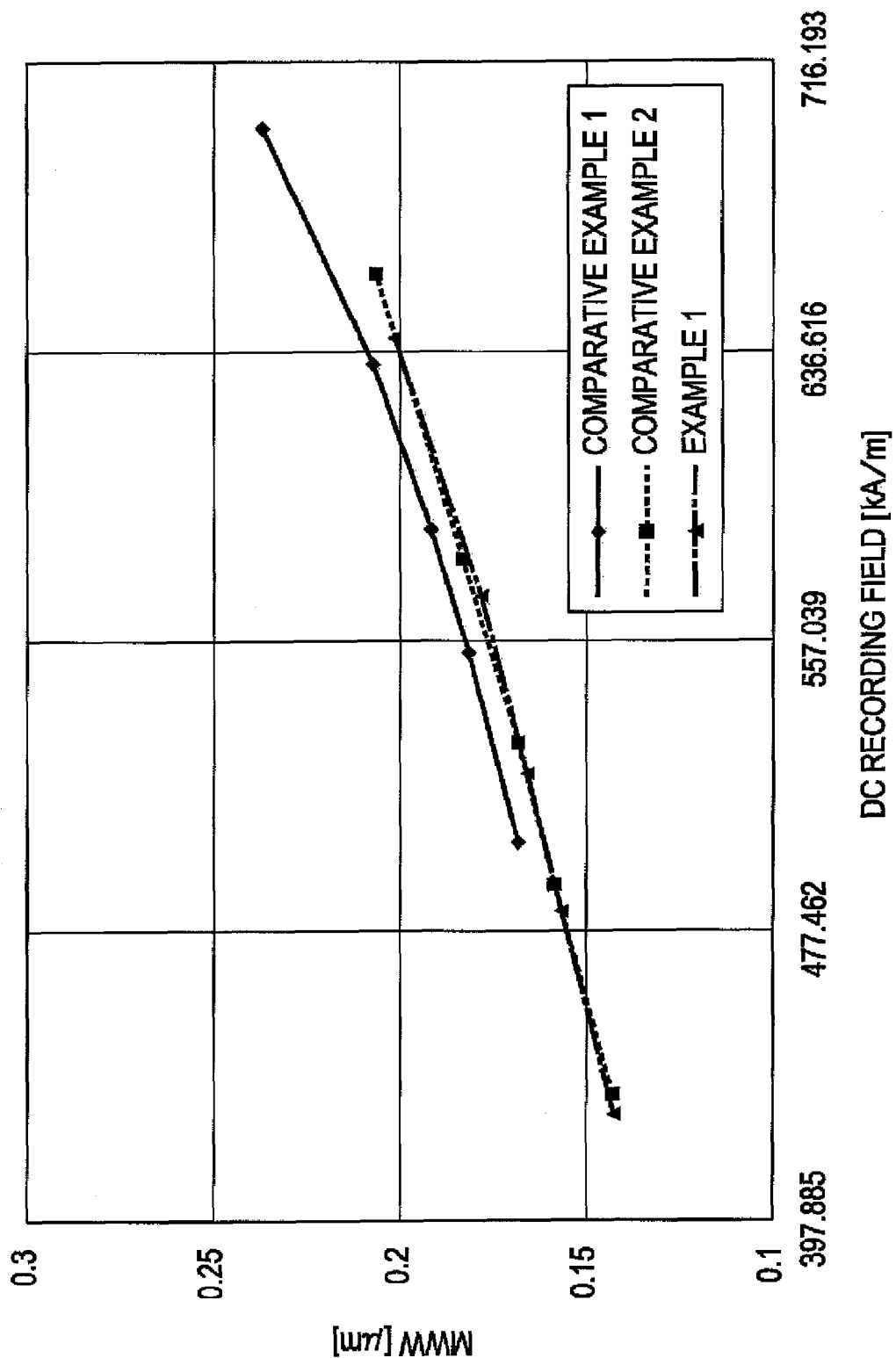
FIG. 22 is a graph showing the relationship between the recording magnetic field intensity (maximum value) in the main magnetic pole surface and MWW (Magnetic Write Width) on the basis of analysis of the simulation results shown in FIGS. 16 to 21.

FIG. 22 is a graph showing the relationship between the recording magnetic field intensity (maximum value) [kA/m] in the main magnetic pole surface and MWW (Magnetic Write Width) [μm], which is the breadth of the magnetic field intensity at 3.18 kA/m at a center position in the height direction of the hard film of the recording medium, on the basis of analysis of the simulation results shown in FIGS. 16 through 21. As is apparent from FIG. 22, the MWW is proportional to the recording magnetic field intensity. The recording magnetic field intensity increases with MWW. When the recording magnetic field intensity is the same, the MWW is highest in Comparative Example 1 and is substantially the same between Comparative Example 2 and Example 1. The rate of change in MWW against the recording magnetic field intensity is substantially the same in Comparative Examples 1 and 2 and Example 1.

Figure 23:
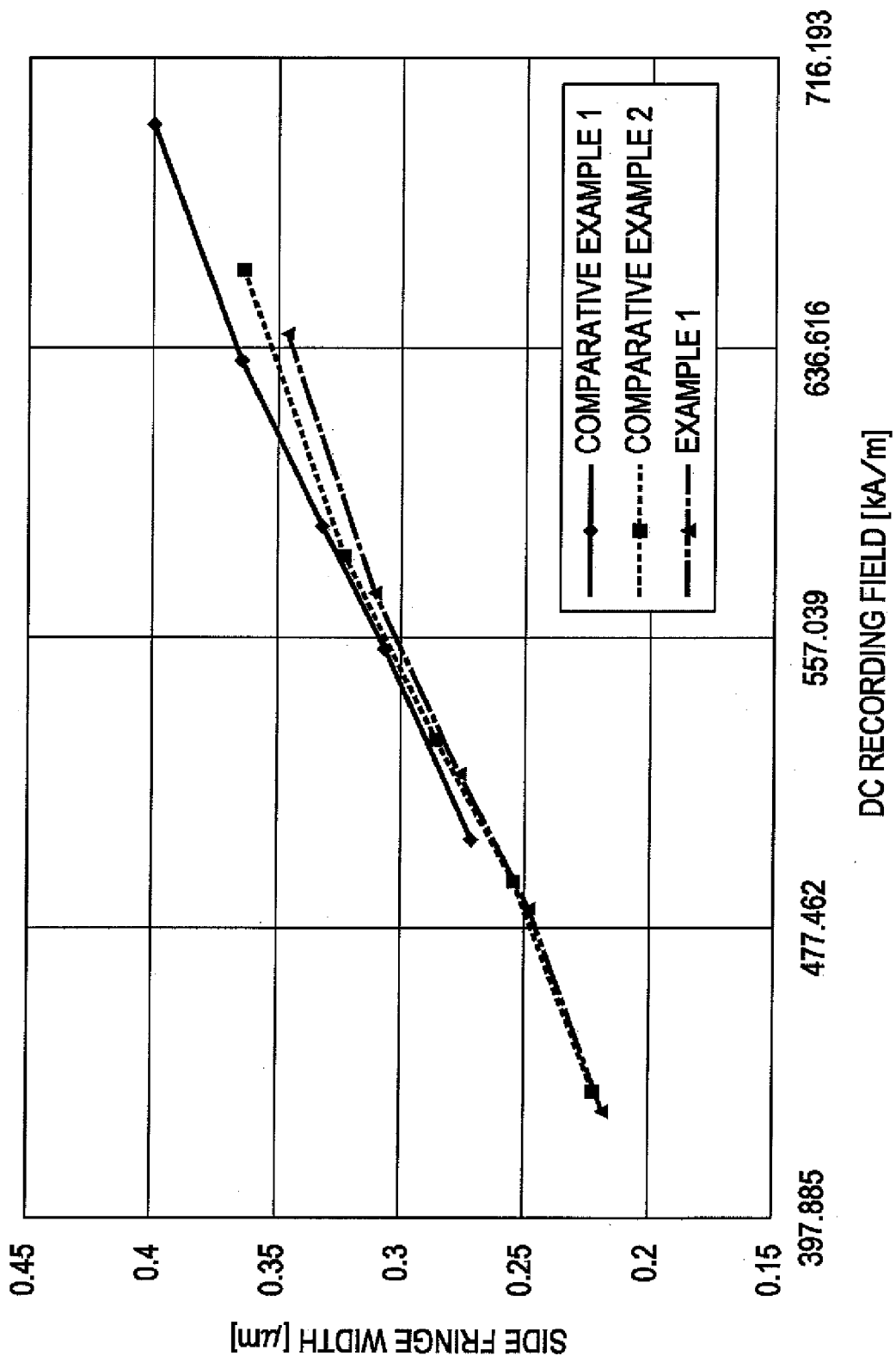
FIG. 23 is a graph showing the relationship between the recording magnetic field intensity (maximum value) in the main magnetic pole surface and the side fringe width on the basis of the analysis of the simulation results shown in FIGS. 16 to 21.

FIG. 23 is a graph showing the relationship between the recording magnetic field intensity (maximum value) [kA/m] in the main magnetic pole surface and the side fringe width [μm] on the basis of the analysis of the simulation results shown in FIGS. 16 to 21. Referring to FIG. 23, when the recording magnetic field intensity is the same, the side fringe width is smaller in Example 1 than in Comparative Examples 1 and 2, and the side fringe width increases with the recording magnetic field intensity. The rate of change is the smallest in Example 1. Thus, it is evident that, in Example 1, the side fringe width can be inhibited to the highest extent under high recording magnetic field intensity.

The above-described simulation results clearly show that according to the present embodiment (Example 1) in which the pole straight part 110A and the first flared part 110B are both beveled, the magnetic field intensity distribution at the lower-surface-side of the main magnetic pole layer 110 can be enhanced without degrading the recording magnetic field intensity, the recording magnetic field gradient, and MWW and the leakage magnetic field from the first flared part 110B can be decreased. In this manner, the side fringe width can be suppressed to a small value even when the recording magnetic field intensity is increased, and thus, narrower tracks and higher density recording can be achieved.

Although the beveled angles θ1 and θ2 of the pole straight part 110A and the first flared part 110B are the same in this embodiment, they may be different from each other. Furthermore, although it is practical that the cross-sectional shape of the pole straight part 110A is the same as that of the first flared part 110B at the junction between the pole straight part 110A and the first flared part 110B, they may he different from each other.

These results indicate that concentration of the magnetic field is reduced near the junction between the pole straight part 110A and the first flared part 110B by beveling. This tendency is particularly strong in the samples with a small neck height Nh, as is clear from comparison of FIGS. 8, 10, and 12 with FIGS. 9, 11, and 13.

What is claimed is:

1. A perpendicular magnetic recording head, comprising:
a nonmagnetic insulating layer;
a main magnetic pole layer disposed on the nonmagnetic insulating layer, the main magnetic pole layer including:
a pole straight part exposed in an opposing surface opposite a recording medium, and
a flared part that extends from the pole straight part in a height direction, the flared part broadening in a track width direction as the flared part extends in the height direction; and
a return path layer that opposes the main magnetic pole layer with a nonmagnetic layer therebetween, the return path layer being exposed in the opposing surface,
wherein the pole straight part of the main magnetic pole layer as viewed from the opposing surface has a trapezoidal shape over an entire length of the pole straight part in the height direction, the trapezoidal shape being narrowed at the nonmagnetic insulating layer-side,
wherein the flared part as viewed from the opposing surface has a trapezoidal shape at least at a junction with the pole straight part, the trapezoidal shape being narrowed at the nonmagnetic insulating layer-side,
wherein the trapezoidal shape of the flared part changes as the flared portion extends in the height direction from the junction with the pole straight part such that a ratio of a length of a long base of the trapezoid to a length of a short base of the trapezoid is equal to 1.

2. The perpendicular magnetic recording head according to claim 1, wherein the flared part has the same cross-sectional shape as the trapezoidal shape of the pole straight part at the junction between the flared part and the pole.

* * * * *